US008498248B2

(12) United States Patent
Zheng et al.

(10) Patent No.: US 8,498,248 B2
(45) Date of Patent: Jul. 30, 2013

(54) MEDIUM ACCESS CONTROL PROTOCOL DATA UNIT OVERHEAD IMPROVEMENTS

(75) Inventors: Haihong Zheng, Coppell, TX (US); Shashikant Maheshwari, Irving, TX (US); Adrian Boariu, Irving, TX (US); Yousuf Saifullah, Richardson, TX (US)

(73) Assignee: Nokia Siemens Networks Oy, Espoo (FI)

( * ) Notice: Subject to any disclaimer, the term of this patent is extended or adjusted under 35 U.S.C. 154(b) by 888 days.

(21) Appl. No.: 12/141,036

(22) Filed: Jun. 17, 2008

(65) Prior Publication Data

US 2009/0310533 A1 Dec. 17, 2009

(51) Int. Cl.
*H04W 4/00* (2009.01)
(52) U.S. Cl.
USPC .......................................... 370/329; 455/451
(58) Field of Classification Search
USPC ................. 370/328, 331, 349, 432, 329, 208, 370/389, 270; 455/450
See application file for complete search history.

(56) References Cited

U.S. PATENT DOCUMENTS

| | | | |
|---|---|---|---|
| 2004/0170121 A1* | 9/2004 | Kim et al. ....................... 370/208 |
| 2005/0013272 A1* | 1/2005 | Hwang et al. ................... 370/328 |
| 2005/0047416 A1* | 3/2005 | Heo et al. ....................... 370/395.4 |
| 2005/0108610 A1* | 5/2005 | Kim et al. ....................... 714/748 |
| 2005/0185608 A1* | 8/2005 | Lee et al. ....................... 370/328 |
| 2006/0133424 A1* | 6/2006 | Han et al. ....................... 370/474 |
| 2006/0209870 A1* | 9/2006 | Lee et al. ....................... 370/432 |
| 2007/0041378 A1* | 2/2007 | Ihm et al. ....................... 370/389 |
| 2007/0086380 A1* | 4/2007 | Lim et al. ....................... 370/329 |
| 2007/0230476 A1* | 10/2007 | Ding ............................... 370/394 |
| 2008/0186946 A1* | 8/2008 | Marinier et al. ............... 370/349 |
| 2009/0016290 A1* | 1/2009 | Chion et al. .................... 370/329 |
| 2009/0034526 A1* | 2/2009 | Ahmadi et al. ................. 370/392 |
| 2009/0040970 A1* | 2/2009 | Ahmadi et al. ................. 370/329 |
| 2009/0100310 A1* | 4/2009 | Yoo et al. ....................... 714/748 |
| 2009/0103632 A1* | 4/2009 | Choi et al. ................ 375/240.25 |
| 2009/0168770 A1* | 7/2009 | Mohanty ........................ 370/389 |
| 2009/0196230 A1* | 8/2009 | Kim et al. ....................... 370/328 |
| 2009/0213810 A1* | 8/2009 | Shousterman et al. ........ 370/331 |
| 2009/0220085 A1* | 9/2009 | Tao et al. ....................... 380/270 |
| 2009/0245083 A1* | 10/2009 | Hamzeh ........................ 370/204 |
| 2009/0296683 A1* | 12/2009 | Raju et al. ..................... 370/349 |
| 2009/0298508 A1* | 12/2009 | Raju et al. ..................... 455/450 |
| 2009/0300328 A1* | 12/2009 | Raju et al. ..................... 712/204 |

(Continued)

OTHER PUBLICATIONS

DRAFT Standard for Local and metropolitan area networks PART 16: Air interface for Broadband Wireless Access Systems P802.16Rev2/D3 (Feb. 2008).*

(Continued)

*Primary Examiner* — Bunjob Jaroenchonwanit
(74) *Attorney, Agent, or Firm* — Brake Hughes Bellermann LLP

(57) ABSTRACT

An apparatus comprising a controller configured to pack a plurality of Service Data Units (SDUs) from a plurality of connections associated with a Mobile Station (MS) into a single Medium Access Control (MAC) Protocol Data Unit (PDU). In various embodiments, the controller may be further configured to generate a Generic MAC Header (GMH) that indicates that a plurality of Service Data Units (SDUs) from a plurality of connections associated with a Mobile Station (MS) have been packed into the MAC PDU. In some embodiments, the controller may be further configured to generate, for each SDU, an associated Extended Packing Sub-Header (EPSH). The apparatus further comprising a memory configured to store MAC PDU. The apparatus also comprising a wireless transceiver configured to transmit the MAC PDU.

18 Claims, 9 Drawing Sheets

U.S. PATENT DOCUMENTS

2009/0323584 A1* 12/2009 Raju et al. .................. 370/328
2009/0323585 A1* 12/2009 Raju et al. .................. 370/328
2009/0327716 A1* 12/2009 Raju et al. .................. 713/168

OTHER PUBLICATIONS

IEEE, "IEEE 802.16m System Requirements", IEEE 802.16 Broadband Wireless Access Working Group; IEEE 802.16m-07/002r4, (Oct. 19, 2007), pp. 1-26.

Wikipedia, "Media Access Control", retrieved on Jun. 12, 2008 Wikipedia.org/wiki/media_access_control, pp. 1-3.

WIMAX, "WiMAX Forum Network Architecture", (Stage 2: Architecture Tenets, Reference Model and Reference Points) (Stage 2 and Stage 3 Abrreviations) Release 1, Version 1.2, (Jan. 11, 2008),p pp. 1-9.

WIMAX, "WiMAX Forum Network Architecture", (Stage 2: Architecture Tenets, Reference Model and Reference Points) (Part 1) Release 1, Version 1.2, (Jan. 11, 2008), pp. 1-36.

WIMAX, "WiMAX Forum Network Architecture", (Stage 2: Architecture Tenets, Reference Model and Reference Points) (Part 2) Release 1, Version 1.2,(Jan. 11, 2008), pp. 1-160.

WIMAX, "WiMAX Forum Network Architecture", (Stage 2: Architecture Tenets, Reference Model and Reference Points) (Part 3-Informative Annex) Release 1, Version 1.2, (Jan. 11, 2008), pp. 1-28.

WIMAX, "WiMAX Forum Network Architecture", (Stage 2: Architecture Tenets, Reference Model and Reference Points) (Part 0) Release 1, Version 1.2, (Jan. 11, 2008), pp. 1-8.

WIMAX, "WiMAX Forum Network Architecture", (Stage 3: Detailed Protocols and Procedures) Release 1, Version 1.2, (Jan. 11, 2008), pp. 1-571.

WIMAX, "WiMAX Forum Network Architecture", (Stage 3: Detailed Protocols and Procedures) (Annex: WiMAX 3GPP Interworking) Release 1, Version 1.2, (Jan. 11, 2008),pp. 1-11.

WIMAX, "WiMAX Forum Network Architecture", (Stage 3: Detailed Protocols and Procedures) (Annex: Prepaid Accounting) Release 1, Version 1.2, (Jan. 11, 2008), pp. 1-44.

WIMAX, "WiMAX Forum Network Architecture", (Stage 3: Detailed Protocols and Procedures) (Annex: R6/R8 ASN Anchored Mobility Scenarios) Release 1, Version 1.2, (Jan. 11, 2008), pp. 1-15.

WIMAX, "WiMAX Forum Network Architecture", (Stage 2: Architecture Tenets, Reference Model and Reference Points) (WiMAX Interworking with DSL) Release 1, Version 1.2, (Jan. 11, 2008), pp. 1-8.

WIMAX, "WiMAX Forum Network Architecture", (Stage 3: Detailed Protocols and Procedures) (Annex: WiMAX 3GPP2 Interworking) Release 1, Version 1.2, (Jan. 11, 2008), pp. 1-17.

WIMAX, "WiMAX Forum Network Architecture", (Stage 2: Architecture Tenets, Reference Model and Reference Points) (3GPP—WiMAX Interworking) Release 1, Version 1.2, (Jan. 11, 2008), pp. 1-10.

WIMAX, "WiMAX Forum Network Architecture", (Stage 2: Architecture Tenets, Reference Model and Reference Points) (3GPP2—WiMAX Interworking) Release 1, Version 1.2, (Jan. 11, 2008),pp. 1-5.

* cited by examiner

| Hdr Type 302 | EC 304 | Type 306 | ESF 308 | CI 310 | EKS 312 | RSV 314 | LEN MSB 316 |
|---|---|---|---|---|---|---|---|
| LEN LSB 318 |||| CID MSB 320 ||||
| CID LSB 322 |||| HCS 324 ||||

FIG. 3b 300b

| Hdr Type 302 | Type 306 | ESF 308 | CI 310 | EKS 312 | RSV 314 | LEN MSB 316 |
|---|---|---|---|---|---|---|
| LEN LSB 318 ||| CID MSB 320 ||||
| CID LSB 322 ||| HCS 324 ||||

FIG. 3c 300c

| Hdr Type 302 | EC 304 | Type 306 | ESF 308 | EKS 312 | RSV 314 | LEN MSB 316 |
|---|---|---|---|---|---|---|
| LEN LSB 318 ||| CID MSB 320 ||||
| CID LSB 322 ||| HCS 324 ||||

FIG. 3d 300d

| Hdr Type 302 | EC 304 | Type 306 | ESF 308 | CI 310 | EKS 312 | RSV 314 | LEN MSB 316 |
|---|---|---|---|---|---|---|---|
| LEN LSB 318 |||| CID MSB 320 ||||
| CID LSB 322 |||| HCS 324 ||||

FIG. 4a 400a

| GMH 402 | EPSH 404 (for CID #1) | SDU 406 (for CID #1) | CRC #1 408 | EPSH 410 (for CID #2) | SDU 412 (for CID #2) | CRC #2 414 |

FIG. 4b 400b

| GMH 452 | EPSH 454 (for SDU #1 & CID #1) | SDU #1 456 (for CID #1) | EPSH 458 (for SDU #2 & CID #1) | SDU #2 460 (for CID #1) | CRC #1 462 | EPSH 464 (for SDU #3 & CID #2) | SDU #3 468 (for CID #2) | EPSH 470 (for SDU #4 & CID #2) | SDU #4 472 (for CID #2) | CRC #2 474 |

FIG. 4c 490

| FSI 492 | CI 494 | EKS 496 | Other Fields 498 |

FIG. 5a
500a (Prior Art)

| Ext SH Group Length 502 | | |
|---|---|---|
| RSV 504 | Ext SH Type 506 | |
| Ext SH Body 508 | | |
| ... | | |
| RSV 504n | Ext SH Type 506n | |
| Ext SH Body 508n | | |

FIG. 5b
500b

| Level 1 Bit Mask 520 |
|---|
| Level 2 Bit Mask #1 522 |
| ... |
| Level 2 Bit Mask #i 522i |
| Ext SH Body 508 |
| ... |
| Ext SH Body 508n |

FIG. 5c
500c

| Ext 530 | Ext SH Type 532 |
|---|---|
| Ext SH Body 508 | |
| ... | |
| Ext 530n | Ext SH Type 532n |
| Ext SH Body 508n | |

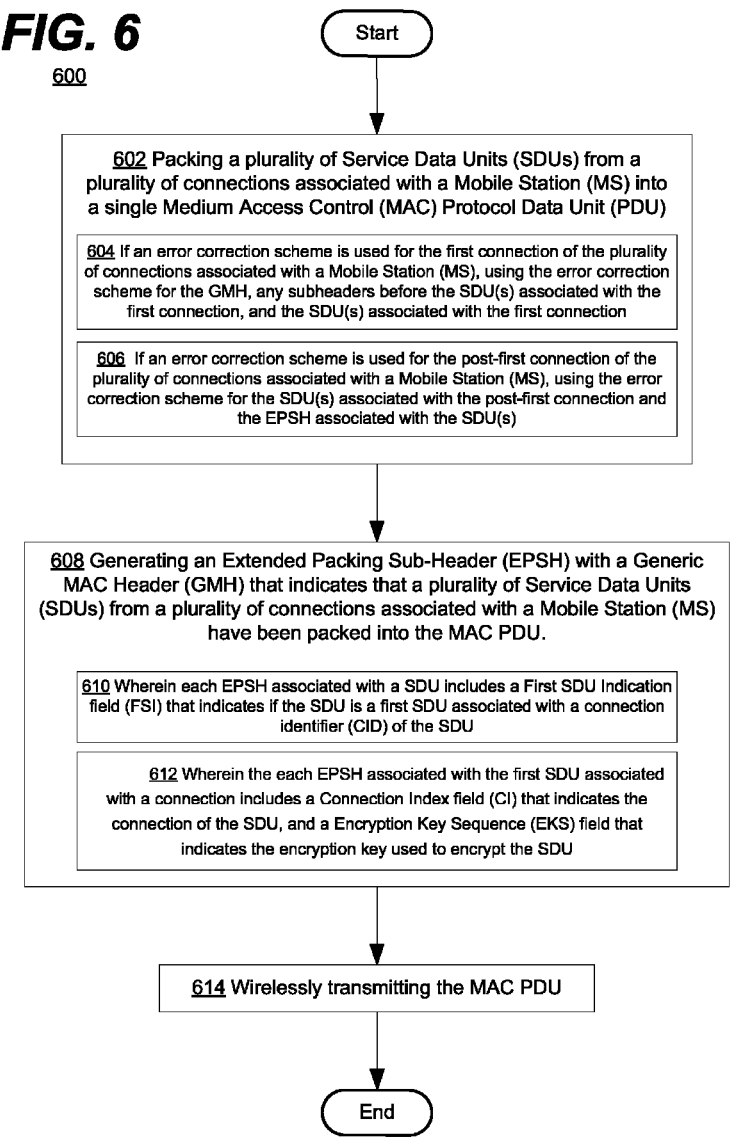

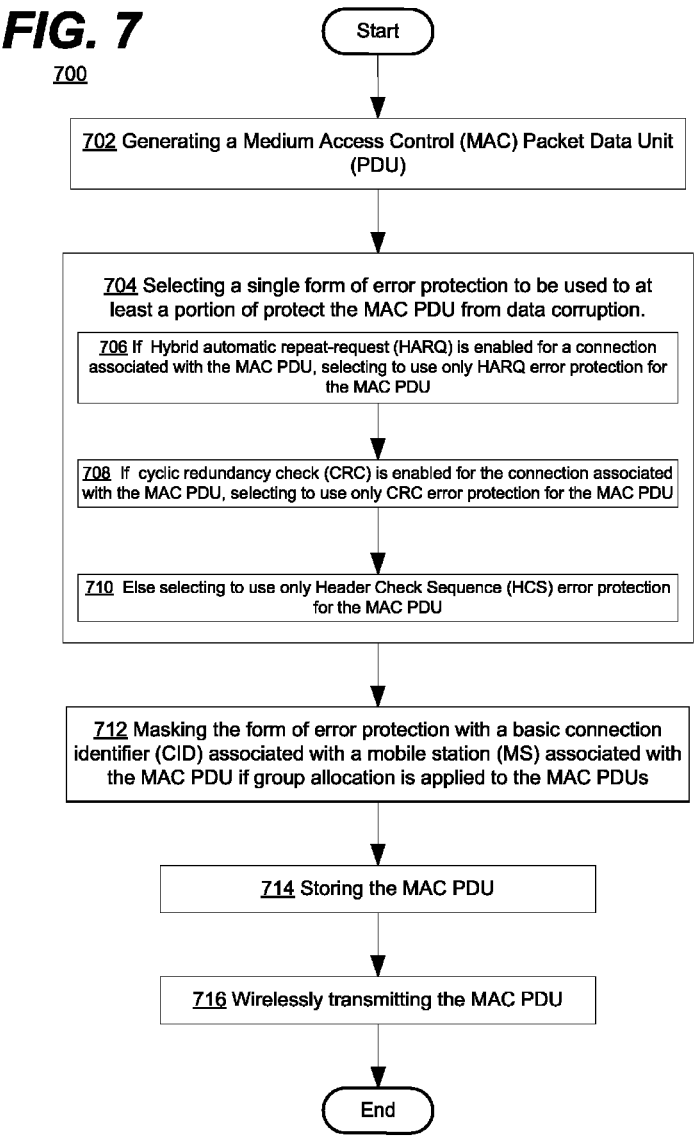

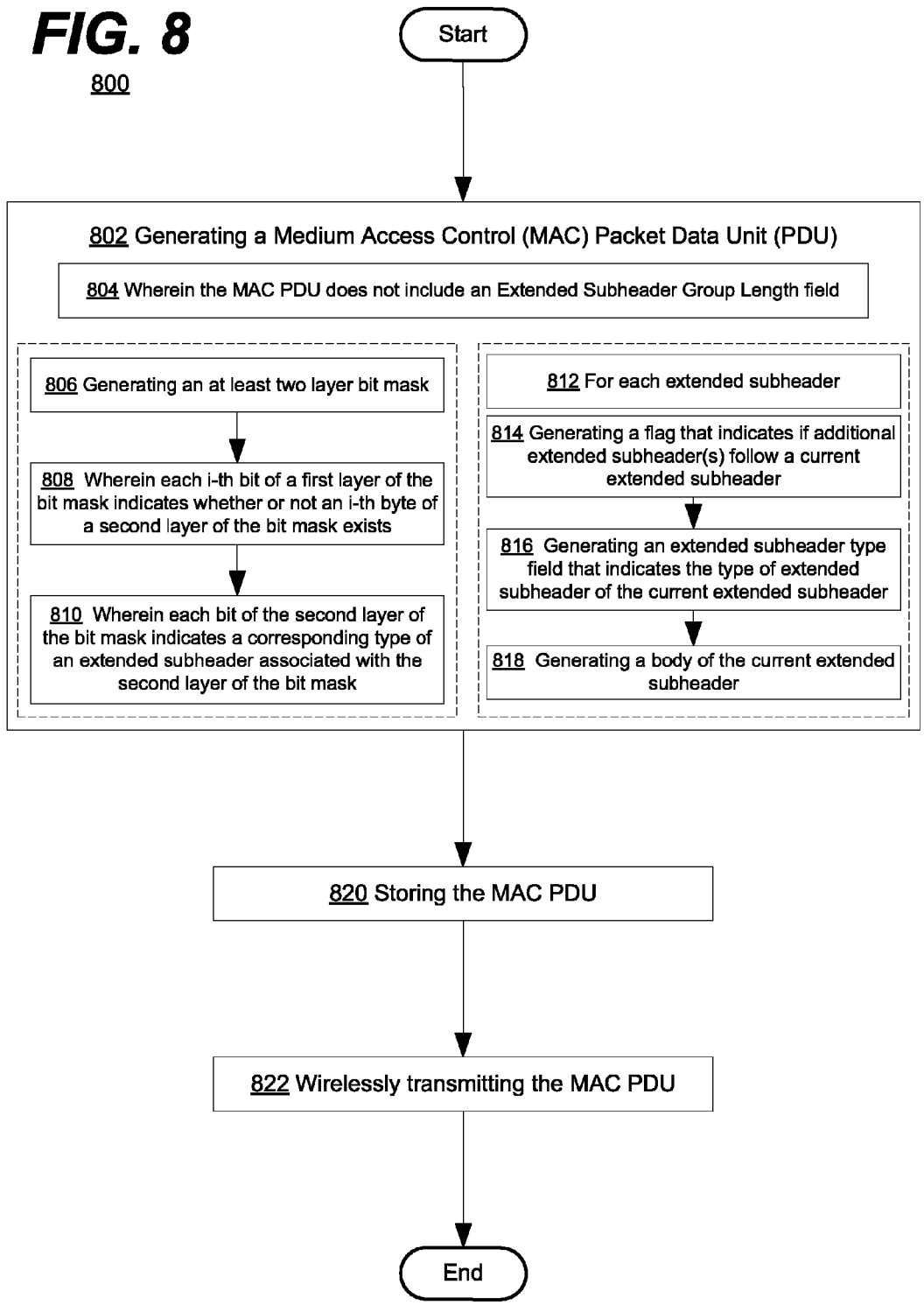

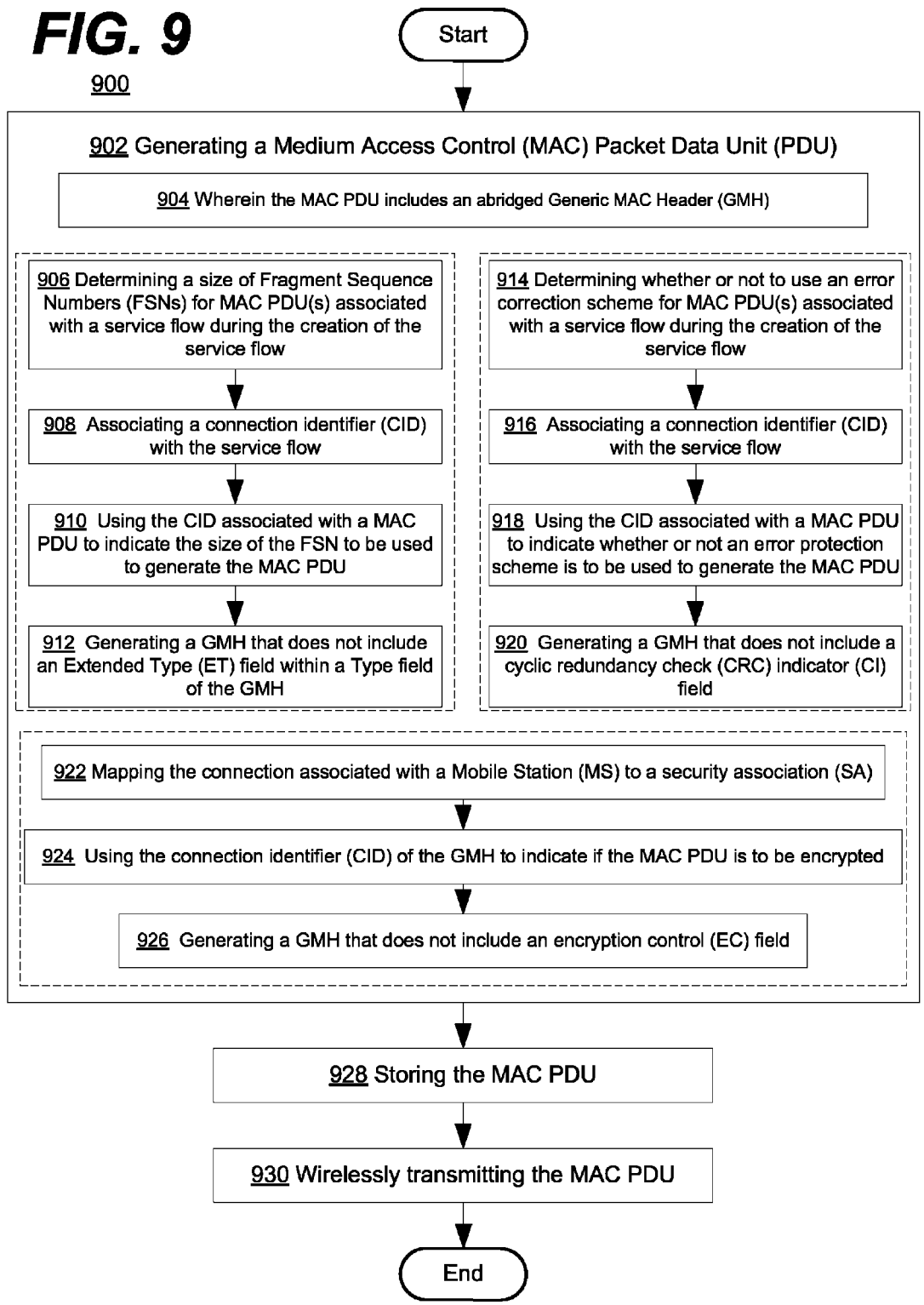

MEDIUM ACCESS CONTROL PROTOCOL DATA UNIT OVERHEAD IMPROVEMENTS

TECHNICAL FIELD

This description relates to wireless networks.

BACKGROUND

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

One particular derivative of the 802.16 standard is the, as yet finished, 802.16m standard that attempts to increase the data rate of wireless transmissions to 1 Gbps while maintaining backwards compatibility with older networks. IEEE 802.16 Broadband Wireless Access Working Group, *IEEE 802.16m System Requirements*, Oct. 19, 2007.

The data rates of wireless networks often lag behind their wired counterparts. This is often due to data transmission and corruption issues that occur for various reasons, such as, for example, as the data passing through heterogeneous mediums (e.g., air, walls, etc.), station mobility, distance from transmitter/receiver, etc. In addition, wireless networks often include a large amount of overhead because of these issues. As a result, the quoted data rates (e.g., 1 Gbps) do not convey the actual rate at which useable information (non-overhead) is transmitted. These useable information rates may be as low as 50% of the actual data rate (that includes useable information plus overhead information).

SUMMARY

According to one general aspect, an apparatus comprising a controller configured to pack a plurality of Service Data Units (SDUs) from a plurality of connections associated with a Mobile Station (MS) into a single Medium Access Control (MAC) Protocol Data Unit (PDU). In various embodiments, the controller may be further configured to generate a Generic MAC Header (GMH) that indicates that a plurality of Service Data Units (SDUs) from a plurality of connections associated with a Mobile Station (MS) have been packed into the MAC PDU. In some embodiments, the controller may be further configured to generate, for each SDU, an associated Extended Packing Sub-Header (EPSH). The apparatus further comprising a memory configured to store MAC PDU. The apparatus also comprising a wireless transceiver configured to transmit the MAC PDU.

According to another general aspect, an apparatus comprising a controller configured to generate a Medium Access Control (MAC) Packet Data Unit (PDU) and select a single form of error protection to be used to protect the MAC PDU from data corruption. In various embodiments, the controller may be configured to select a form of error protection by a set of condition rules. Such rules may include if Hybrid automatic repeat-request (HARQ) is enabled for a connection associated with the MAC PDU, the controller is configured to use only HARQ error protection for the MAC PDU. If HARQ is not enabled, if cyclic redundancy check (CRC) is enabled for the connection associated with the MAC PDU, the controller is configured to use only CRC error protection for the MAC PDU. Otherwise the controller is configured to use only Header Check Sequence (HCS) error protection for the Generic MAC header inside the MAC PDU. In some embodiments, the apparatus may include a memory configured to store the MAC PDU, and a wireless transceiver configured to transmit the MAC PDU.

According to another general aspect, an apparatus comprising a controller configured to generate a Medium Access Control (MAC) Packet Data Unit (PDU) that includes a plurality of extended subheaders. Wherein the MAC PDU does not include an Extended Subheader Group Length field. The apparatus may also, in one embodiment, include a memory configured to store the MAC PDU, and a wireless transceiver configured to transmit the MAC PDU.

According to another general aspect, an apparatus comprising a controller configured to generate a Medium Access Control (MAC) Packet Data Unit (PDU) that includes an abridged Generic MAC Header (GMH). The apparatus may also, in one embodiment, include a memory configured to store the MAC PDU, and a wireless transceiver configured to transmit the MAC PDU.

According to another general aspect, a method comprising packing a plurality of Service Data Units (SDUs) from a plurality of connections associated with a Mobile Station (MS) into a single Medium Access Control (MAC) Protocol Data Unit (PDU). The method also comprising generating an Extended Packing Sub-Header (EPSH) with a Generic MAC Header (GMH) that indicates that a plurality of Service Data Units (SDUs) from a plurality of connections associated with a Mobile Station (MS) have been packed into the MAC PDU. The method further comprising generating, for each SDU, an associated EPSH. The method also comprising wirelessly transmitting the MAC PDU.

According to another general aspect, a method comprising generating a Medium Access Control (MAC) Packet Data Unit (PDU). The method further comprising selecting a single form of error protection to be used to protect the MAC PDU from data corruption. In various embodiments, selecting may include selecting a form of error protection using a set of conditional rules. In various embodiments, the rule set may include if Hybrid automatic repeat-request (HARQ) is enabled for a connection associated with the MAC PDU, selecting to use only HARQ error protection for the MAC PDU. If HARQ is not enabled, if cyclic redundancy check (CRC) is enabled for the connection associated with the MAC PDU, selecting to use only CRC error protection for the MAC PDU. Otherwise, selecting to use only Header Check Sequence (HCS) error protection for the MAC PDU.

According to another general aspect, a method comprising generating a Medium Access Control (MAC) Packet Data Unit (PDU) that includes a plurality of extended subheaders. In some embodiments, the MAC PDU may not include an Extended Subheader Group Length field. The method further comprising wirelessly transmitting the MAC PDU.

According to another general aspect, a method comprising generating a Medium Access Control (MAC) Packet Data Unit (PDU) that includes an abridged Generic MAC Header (GMH), and wirelessly transmitting the MAC PDU.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 3 is a block diagram of a header in accordance with at least one example embodiment of the disclosed subject matter.

FIG. 4 is a block diagram of a data unit in accordance with at least one example embodiment of the disclosed subject matter.

FIG. 5 is a block diagram of a sub-header in accordance with at least one example embodiment of the disclosed subject matter.

FIG. 6 is a flowchart of a technique in accordance with an example embodiment of the disclosed subject matter.

FIG. 7 is a flowchart of a technique in accordance with an example embodiment of the disclosed subject matter.

FIG. 8 is a flowchart of a technique in accordance with an example embodiment of the disclosed subject matter.

FIG. 9 is a flowchart of a technique in accordance with an example embodiment of the disclosed subject matter.

DETAILED DESCRIPTION

Figure 1:
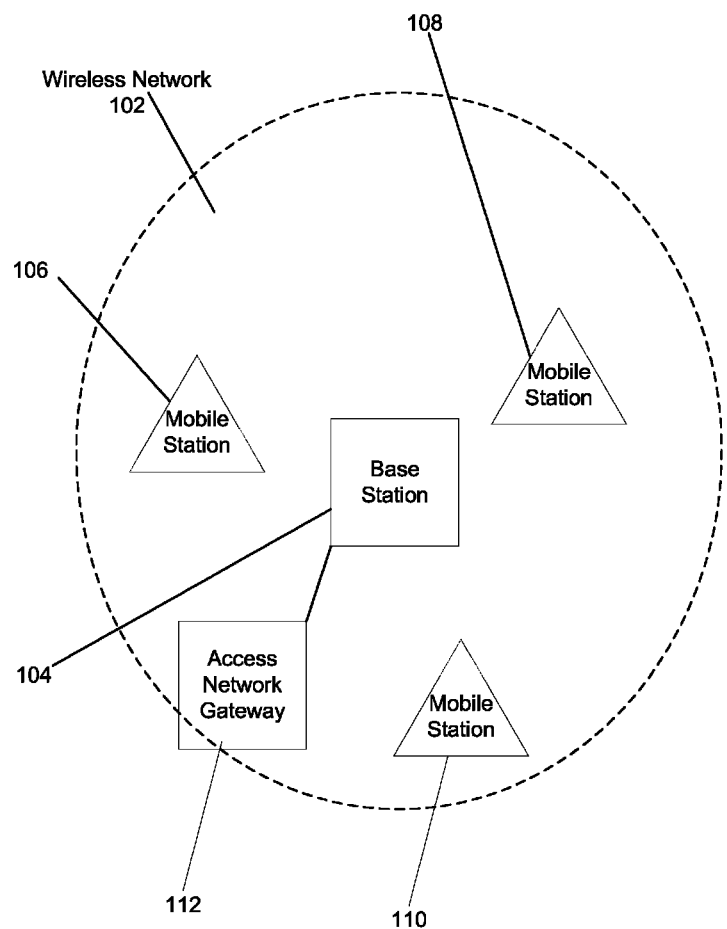
FIG. 1 is a block diagram of a wireless network in accordance with an example embodiment of the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network, a Wide Area Network (WAN), the Internet, etc. In various embodiments, the base station 104 may be coupled or connected with the other network 120 via an access network controller (ASN) or gateway (GW) 112 that may control, monitor, or limit access to the other network.

In one embodiment, data may be transmitted from the BS to the MS (or vice versa) using a service flow. In various embodiments, a service flow may be a connection management scheme that dictates the quality of service (QoS), priority, security parameters, etc. of data that is transmitted between the BS/MS. The service flow may include a connection identifier (CID) that identifies a connection between two peers (e.g., BS and MS). The CID may, in one embodiment, map a service flow to a connection, which may include a unidirectional mapping between a BS and a MS.

Figure 2:
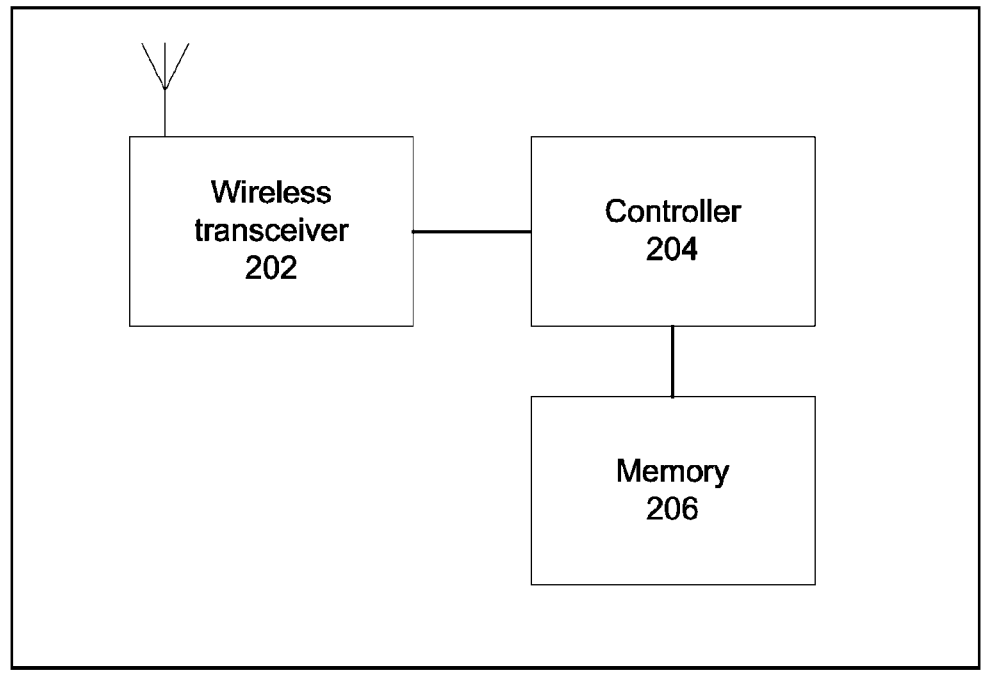
FIG. 2 is a block diagram of a wireless device in accordance with an example embodiment of the disclosed subject matter.

FIG. 2 is a block diagram of a wireless device 200 in accordance with an example embodiment of the disclosed subject matter. In one embodiment, the wireless device 200 may include a base station such as illustrated in FIG. 1. In another embodiment, the wireless device 200 may include a mobile station such as those illustrated in FIG. 1. In one embodiment, the wireless device 200 may include a wireless transceiver 202, a controller 204, and a memory 206. In various embodiments, the controller 204 may include a processor. In various embodiments, the transceiver 202 may be configured to communicate via at least one networking standard (e.g., WiFi and WiMAX). For example, some operations illustrated and/or described herein, may be performed by a controller 204, under control of software, firmware, or a combination thereof.

The Open Systems Interconnection Basic Reference Model (OSI Model) is a commonly used layered, abstract description for communications and computer network protocol design. A layer, in this context, may include a collection of related functions that provide services to the layer above it and receives service from the layer below it. For example, a layer that provides error-free communications across a network provides the path needed by applications above it, while it uses the next lower layer to send and receive packets that make up the contents of the path. The layers, therefore, are hierarchal and each layer provides a greater level of abstraction from the layer below. From top to bottom, the OSI Model consists of the Application, Presentation, Session, Transport, Network, Data Link, and Physical layers.

Of immediate interest is the second layer of the OSI Model, the data layer. In the OSI model the Data layer or Data Link layer (L2), generally provides the functional and procedural means to transfer data between network entities (e.g., peer entities) and to detect and possibly correct errors that may occur in the physical layer. A commonly used sub-layer of the data layer is the Medium Access Control (MAC) sub-layer. It generally provides addressing and channel access control mechanisms that make it possible for several terminals or network nodes to communicate within a multipoint network, typically a local area network (LAN) or metropolitan area network (MAN).

In the 802.16 standard the MAC sub-layer provides a connection-oriented service to upper layers of the protocol stack. Media access control packet data units (MAC PDUs) are transmitted in on-air physical layer (PHY) slots. In the 802.16 standard transmission of data is regulated into resource allocation blocks or slots which are then parceled out to MSs or BSs.

Within these MAC PDUs, MAC service data units (MS-DUs or MAC SDUs) are often transmitted. MAC SDUs are the packets transferred between the MAC and the layer above. MAC PDUs are the packets transferred between the MAC and the PHY layer below. Across MAC PDUs, MSDUs can be fragmented, and within MAC PDUs, MSDUs can be packed (aggregated). Fragments of MSDUs can be packed within a single packed MAC PDU. In various embodiments, automatic retransmission request (ARQ), or other error correction schemes, may be used to minimize data corruption during transmission, for example, by allowing for a MS/BS to request the retransmission of unfragmented MSDUs and fragments of MSDUs.

In one embodiment, a MAC PDU generally includes a header field, a payload field, and a cyclic redundancy check (CRC) field. The MAC PDU header field is often used to transmit header information for a MAC PDU transmission. In various embodiments, the MAC header field may include a generic MAC header (GMH), as shown in more detail in FIG. 3 and described below. In some embodiments, the payload field is used to transmit data such as MAC SDUs. Also, in one embodiment, the CRC field may be used to transmit CRC bits for detecting an error in the transmission of the MAC PDU.

The format of one embodiment the MAC PDU is described in more detail in the 802.16 standard.

Below are described at least four schemes for reducing the overhead or size of a MAC PDU. In various embodiments, the apparatus 200 may generate or receive MAC PDUs similar to the embodiments described below. It is understood, that while the schemes are described in terms of generating a MAC PDU, the apparatus 200 may also be configured to receive and decode or interpret such MAC PDUs. It is also understood that embodiments may exist in which the apparatus 200 is configured to employ one or more of the schemes simultaneously and that they are not mutually exclusive.

Regarding the first scheme, FIG. 3a is a block diagram of a generic MAC header (GMH) 300a in accordance with the 802.16 standard. It is shown and described so that comparison to the known GMH format may illustrate and illuminate the disclosed subject matter. The GMH 300a generally includes 6 bytes (8-bits per byte) and is not shown to scale.

A GMH 300a typically includes a header type (HT) field 302 which indicates whether a generic MAC PDU or another type of MAC PDU header (e.g., a bandwidth request message (BRM)) is being transmitted. This HT field 302 may, in one embodiment, be 1-bit. The HT field 302 is typically set to "0" in a GMH.

A GMH 300a typically includes an encryption control (EC) field 304 that indicates whether or not the payload is encrypted. This EC field 304 may, in one embodiment, be 1-bit.

A GMH 300a typically includes a type field 306 that indicates which types of sub-headers and special payload types may be found in the message payload. In one embodiment, Type field 306 may be represented with 6 bits. The sub headers may be used, in one embodiment, to implement the signaling of fragmentation, packing, ARQ and mesh features of the MAC, etc.

A GMH 300a typically includes an extended sub-header (ESF) field 308 that indicates whether or not an extended sub-header is present. In one embodiment, the ESF field 308 may include 1-bit.

A GMH 300a typically includes a cyclic redundancy check (CRC) indicator (CI) field 310 that indicates whether the MAC PDU uses an optional CRC at the end of the MAC PDU. In one embodiment, the CI field 310 may include 1-bit.

A GMH 300a typically includes an encryption key sequence ("EKS") field 312 that indicates the kind of encryption key used in the MAC PDU. In various embodiments, a privacy sub-layer may allow overlapping keys so that keys can be updated without interrupting the flow of data. Furthermore, the EKS field 312 differentiates between old and new keys during an update. In one embodiment, the EKS field 312 may include 2-bits.

A GMH 300a typically includes a reserved (RSV) field 314 that is reserved for future use. In one embodiment, the RSV field 314 may include 1-bit.

A GMH 300a typically includes a length (LEN) field 316 and 318 that indicates the length of the payload field of the MAC PDU. As illustrated the LEN field 318 is broken across a byte boundary and is illustrated as a LEN MSB portion 316 and a LEN LSB portion 318. In one embodiment, the LEN field 318 may indicate the number of bytes in the MAC PDU including the header and the CRC. In various embodiments, the LEN field 318 may include 11-bits. In such an embodiment, the bit size limits the frame length, allowing a total of 2,047 bytes in the MAC PDU.

A GMH 300a typically includes a connection identifier (CID) field 320 and 322 that indicates which connection the MAC PDU is associated with. As illustrated, the CID field is broken across a byte boundary and illustrated as a CID MSB portion 320 and a CID LSB portion 322. In various embodiments, the CID field 320 and 322 may include 16-bits or 2 bytes.

A GMH 300a typically includes a header checksum (HCS) field 324 that is used to detect an error in the GMH. In various embodiments, the HCS 324 may include a 1 byte CRC of the first 5 bytes of the GMH 300a.

FIG. 3b is a block diagram of a generic MAC header (GMH) 300b in accordance with an embodiment of the disclosed subject matter. In one embodiment, the apparatus 200 of FIG. 2 may be configured to generate a MAC PDU with a GMH 300b.

In such an embodiment, the controller 204 or other portion of apparatus 200 of FIG. 2 may be configured to generate a MAC PDU that includes a truncated or abridged GMH. In one embodiment, the truncated GMH may be smaller than the standard GMH 300a. It is understood that in various embodiments, truncation of the GMH may not include simply removing the end of the GMH but removing a middle or beginning portion of the GMH.

In one embodiment, the memory 206 or apparatus 200 may be configured to store, even temporarily, the MAC PDU. In such an embodiment, the wireless transmitter 202 or apparatus 200 may be configured to wirelessly transmit the MAC PDU.

In one embodiment, the controller 204 or apparatus 200 may be configured to map a connection associated with a mobile station (MS) to a security association (SA). In various embodiments, the CID may be mapped to a security association via a security association identifier (SAID). In such an embodiment, the SA may be established as part of a service flow. In one embodiment, the mapping may be achieved by including the SAID of an existing SA in the service flow addition procedure (e.g., a Dynamic Service Addition (DSA) procedure).

In one embodiment, the controller 204 or apparatus 200 may be configured to use the CID field 320 and 322 of the GMH 300b to indicate whether or not the MAC PDU is to be encrypted or not. In various embodiments, the SA may dictate whether or not PDUs associated with the SA are or should be encrypted. In one embodiment, because the CID is mapped to the SA, the CID may indicate whether or not encryption should be used.

In one embodiment, the controller 204 or apparatus 200 may be configured to generate a GMH 300b that does not include an EC field 304. In such an embodiment, the EC field 304 may be redundant and therefore eligible for abridgment or truncation. In such an embodiment, the size of the GMH 300b may be reduced by 1-bit from the standard GMH 300a.

FIG. 3c is a block diagram of a generic MAC header (GMH) 300c in accordance with an embodiment of the disclosed subject matter. In one embodiment, the apparatus 200 of FIG. 2 may be configured to generate a MAC PDU with a GMH 300c. In various embodiments, the apparatus 200 may also be configured to store and/or transmit the MAC PDU, as described above.

In one embodiment, the controller 204 or apparatus 200 may be configured to determine whether or not to use an error correction scheme for MAC PDUs during the creation of the service flow associated with the MAC PDUs. In some embodiments, the use of error correction may be based upon the application using the transmitted data. This application may establish the service flow and therefore the need (or lack thereof) for error correction.

In one embodiment, during the establishment of the service flow the controller 204 or apparatus 200 may include a field in the service flow parameters that indicates that any associated MAC PDUs are to use error correction (e.g., CRC). In one embodiment, the sixth ($6^{th}$) bit of the "Request/Transmission Policy" parameter of service flow parameters specified in the 802.16 standard may be repurposed to indicate the use of error correction. If such a bit is set, in one embodiment, CRC may be used for the associated MAC PDUs. If not, CRC may not be used.

In one embodiment, the controller 204 or apparatus 200 may be configured to associate a CID with the service flow. In such an embodiment, the controller 204 or apparatus 200 may be configured to use the CID associated with a MAC PDU to indicate whether or not an error protection scheme is to be used to generate the MAC PDU. In various embodiments, the error protection scheme may include the use of a CRC.

In one embodiment, the controller 204 or apparatus 200 may be configured to generate a GMH 300c that does not include a CI field 310. In such an embodiment, the CI field 310 may be redundant and therefore eligible for abridgment or truncation. In such an embodiment, the size of the GMH 300c may be reduced by 1-bit from the standard GMH 300a.

FIG. 3d is a block diagram of a generic MAC header (GMH) 300d in accordance with an embodiment of the disclosed subject matter. In one embodiment, the apparatus 200 of FIG. 2 may be configured to generate a MAC PDU with a GMH 300d. In various embodiments, the apparatus 200 may also be configured to store and/or transmit the MAC PDU, as described above.

In one embodiment, the controller 204 or apparatus 200 may be configured to determine a size of Fragment Sequence Numbers (FSNs) for MAC PDU(s) associated with a service flow during the creation of the service flow. In the specific embodiment involving the 802.16 standard, the standard dictates that the size of the FSNs is established during the creation of a service flow. Therefore, in such an embodiment, the FSN may be known. In various embodiments, the FSNs may be used to order SDU fragments. The size of the FSNs may determine, in one embodiment, the number of fragments that may be individually tracked.

In one embodiment, the controller 204 or apparatus 200 may be configured to associate a CID with the service flow. In such an embodiment, the controller 204 or apparatus 200 may be configured to use the CID associated with a MAC PDU to indicate the size of the FSNs to generate the MAC PDU.

In one embodiment, the controller 204 or apparatus 200 may be configured to generate a GMH 300d that does not include an Extended Type (ET) field within a Type field 306 of the GMH 300d. In such an embodiment, the ET field may be redundant and therefore eligible for abridgment or truncation. In a specific embodiment involving the 802.16 standard this ET field may include bit #3 of the Type field 306. In such an embodiment, the size of the GMH 300d may be reduced by 1-bit from the standard GMH 300a.

It is understood that the above are merely a few illustrative examples to which the disclosed subject matter is not limited. It is also understood that the above are not mutually exclusive embodiments and may be combined to increase the over head saving or reduction from the GMH 300a. For example, if all three schemes were employed the resultant GMH may be reduced by 3-bits from the standard or unabridged or untruncated GMH 300a.

Regarding the second scheme, a MAC PDU conforming to the 802.16 standard (or another standard in various embodiments) may be protected using three error correction techniques. A first technique may include, in one embodiment, Hybrid ARQ (HARQ) request-resend technique that involves a 2 byte CRC field use to check for errors in the transmission of the MAC PDU. A second technique, in one embodiment, may include a 4 byte CRC field directly associated with the MAC PDU, as described above as coming after the payload portion of the MAC PDU. The third technique may include the 1 byte HCS field of the GMH, as described above.

In one embodiment, the controller 204 or apparatus 200 may be configured to generate a MAC PDU and select a single form of error protection to be used to protect the MAC PDU from data corruption. In such an embodiment, the size MAC PDU may be reduced by 1 or more bytes. In various embodiments, the apparatus 200 may be configured to store and wirelessly transmit the MAC PDU, as described above.

In such an embodiment, the controller 204 or apparatus 200 may be configured to select the HARQ error protection technique for the MAC PDU, if HARQ is enabled for a connection associated with the MAC PDU. In some embodiments, HARQ may be requested or required when the service flow associated with the MAC PDU is created. In such an embodiment, the CID of the MAC PDU may be used to determine the error projection technique. In such an embodiment, the CRC portion of the MAC PDU and the HCS field of the GMH may be omitted from the MAC PDU.

In such an embodiment, the controller 204 or apparatus 200 may be configured to select the CRC error protection technique for the MAC PDU, if CRC is enabled for a connection associated with the MAC PDU. In some embodiments, CRC may be requested or required when the service flow associated with the MAC PDU is created. In such an embodiment, the CID of the MAC PDU may be used to determine the error projection technique. In such an embodiment, the HARQ portion of the MAC PDU and the HCS field of the GMH may be omitted from the MAC PDU.

In such an embodiment, the controller 204 or apparatus 200 may be configured to select the HCS error protection technique to protect the GMH in the MAC PDU, if neither HARQ nor CRC is enabled for a connection associated with the MAC PDU. In such an embodiment, the HARQ and CRC portions of the MAC PDU may be omitted from the MAC PDU.

In various embodiments, these "if" conditions may be prioritized such that only one condition may be fulfilled, and therefore only one error protection technique may be used. For example, in one embodiment, once the HARQ enablement is detected the controller 204 may not determine whether or not CRC or HCS is enabled and simply use only HARQ. In one embodiment, the priority may be ordered such that HARQ is preferred above CRC, and CRC is preferred above HCS. In other embodiments, the priority may differ.

In one embodiment, the controller 204 or apparatus 200 may be configured to mask the form of error protection with a basic connection identifier (CID) associated with a mobile station (MS) associated with the MAC PDU.

In various embodiments, a BS may broadcast to a plurality of MSs using a group CID, as opposed to a MS specific or basic CID. In such an embodiment, group CID may be included in the GMH instead of the basic CID for each MS. As such, the basic CID may not be available for use by the controller 204.

In such an embodiment, the basic CID of the MS may be masked into the form of error protection (e.g., CRC). The controller 204 or apparatus 200 may be configured to derive the basic CID of the MAC PDU from the fields used by the error protection technique.

Regarding the third scheme, in the 802.16 standard, SDUs belonging to the same connection may be packed into one MAC PDU using, in one embodiment, a packing sub-header. However, SDUs belonging to different connections or service flows may not be packed together, even if the SDUs are to be transmitted to the same device. This increases the number of MAC PDUs that are transmitted to a device.

In one embodiment, the controller 204 or apparatus 200 may be configured to pack a plurality of Service Data Units (SDUs) from a plurality of connections associated with a Mobile Station (MS) into a single Medium Access Control (MAC) Protocol Data Unit (PDU). FIG. 4a is a block diagram of a data unit 400a in accordance with at least one example embodiment of the disclosed subject matter. FIG. 4b is a block diagram of a data unit 400b in accordance with at least one example embodiment of the disclosed subject matter. In one embodiment, the controller 204 or apparatus 200 may be configured to store and wirelessly transmit this MAC PDU.

In one embodiment, the controller 204 or apparatus 200 may be configured to generate a Generic MAC Header (GMH) that indicates that a plurality of Service Data Units (SDUs) from a plurality of connections associated with a Mobile Station (MS) have been packed into the MAC PDU. In one embodiment, the GMH may include a type field that indicates that a plurality of SDUs have been packed into the MAC PDU.

In one embodiment, the controller 204 or apparatus 200 may be configured to generate, for each SDU, an associated Extended Packing Sub-Header (EPSH). In one embodiment, these EPSHs may be placed directly before their associated SDUs. In various embodiments, these EPSHs and SDUs may be included as part of the MAC PDU payload portion.

FIG. 4c is a block diagram of an EPSH 490 in accordance with one embodiment of the disclosed subject matter. In one embodiment, the controller 204 or apparatus 200 may be configured to generate EPSHs that include a First SDU Indication (FSI) field 492, a Connection Index (CI) field 494, and an Encryption Key Sequence (EKS) field 496. In various embodiments, the EPSH may also include other fields 498, such as, for example those discussed in the Packing Subheader as defined in 802.16 standard, etc.

In one embodiment, the FSI field 492 may indicate if the SDU is a first SDU associated with a given connection identifier (CID). In such an embodiment, the FSI field 492 may be used to denote when SDUs from a new connection have been reached. In such an embodiment, the SDUs may be grouped within the MAC PDU by connection. In various embodiments, a FSI field value of "1" may indicate a first SDU of a new connection. In some embodiments, the FSI field 492 may include 1 bit.

In one embodiment, the CI field 494 may indicate the connection identifier associated with the SDU. In various embodiments, the CI field 494 may be an optional or conditional field. In such an embodiment, the CI field 494 may only be used if the FSI field 492 indicates that the SDU is a first SDU. In such an embodiment, the controller 204 or apparatus 200 may use the CI field of the first SDU to determine the connection for the subsequent SDUs. In some embodiments, the CI field 494 may include 4 bits.

In one embodiment, the EKS field 496 may indicate the encryption key used to encrypt the SDU. In various embodiments, the EKS field 496 may be an optional or conditional field. In such an embodiment, the EKS field 496 may only be used if the FSI field 492 indicates that the SDU is a first SDU. In such an embodiment, the controller 204 or apparatus 200 may use the EKS field of the first SDU to determine the encryption key for the subsequent SDUs. In some embodiments, the EKS field 496 may include 2 bits.

In one embodiment, if CRC or another error correction scheme is enabled for the SDUs or SDU fragments, the controller 204 or apparatus 200 may be configured to generate a MAC PDU that uses multiple CRCs. In one embodiment, the if an error correction scheme is used for the first connection, the error correction scheme of the first connection may be used for the GMH, any subheaders before the SDU(s) associated with the first connection, and the SDU(s) associated with the first connection. In one embodiment, if an error correction scheme is used for the post-first connection, using the new error correction scheme may be used for the SDU(s) associated with the post-first connection and the EPSH associated with the SDU(s).

For example, in one specific embodiment, FIG. 4a illustrates a MAC PDU 400a that includes multiple SDUs associated with multiple connections. In one embodiment, the MAC PDU 400a may include a GMH 402, a EPSH 404 for CID #1, a SDU 406 for CID #1, a CRC #1 408, a EPSH 410 for CID #2, a SDU 412 for CID #2, and a CRC #2 414.

In such an embodiment, EPSH 404 may indicate that SDU 406 is the first SDU of CID #1, and may include the CI and EKS fields. SDU 406 may be packed after its associated EPSH 404. Also, CRC #1 408 may be used. In one embodiment, the CRC #1 408 may be used to protect GMH 402, EPSH 404 and SDU 406.

Continuing, in such an embodiment, EPSH 410 may indicate that SDU 412 is the first SDU of CID #2, and may include the CI and EKS fields. SDU 412 may be packed after its associated EPSH 404. Also, CRC #2 414 may be used. In one embodiment, the CRC #2 414 may be used to protect only the CID #2 data, e.g., EPSH 412 and SDU 414.

For example, in one specific embodiment, FIG. 4b illustrates a MAC PDU 400b that includes multiple SDUs associated with multiple connections. In one embodiment, the MAC PDU 400b may include a GMH 452, a EPSH 454 for SDU #1/CID #1, a SDU #1 456 for CID #1, a EPSH 458 for SDU #2/CID #1, a SDU #2 460 for CID #1, a CRC #1 462, a EPSH 464 for SDU #3/CID #2, a SDU #3 468 for CID #2, a EPSH 470 for SDU #4/CID #2, a SDU #4 472 for CID #1, and a CRC #2 474.

In such an embodiment, EPSH 454 may indicate that SDU 456 is the first SDU of CID #1, and may include the CI and EKS fields. EPSH 458 may indicate that SDU 460 is not the first SDU of CID #1, and therefore, in one embodiment, may not include CI or EKS fields. SDU 460 may rely on the values presented or stored for these fields in EPSH 454. In one embodiment, the CRC #1 462 may protect GMH 452, EPSH 454, SDU 456, EPSH 458, and SDU 460.

Continuing, in such an embodiment, EPSH 464 may indicate that SDU 468 is the first SDU of CID #2, and may include the CI and EKS fields. EPSH 470 may indicate that SDU 472 is not the first SDU of CID #2, and therefore, in one embodiment, may not include CI or EKS fields. SDU 472 may rely on the values presented or stored for these fields in EPSH 464. In one embodiment, the CRC #2 474 may protect EPSH 464, SDU 468, EPSH 470, and SDU 472.

Regarding the fourth scheme, in the 802.16 standard (for example in its derivative, the 802.16e standard), extended sub-header groups 500a are formatted as illustrated in FIG. 5a. An extended sub-header group length field 502 indicates the total length (in bytes) of the sub-header group. In various embodiments, this field 502 includes 1 byte.

In one embodiment, each extended sub-header includes a reserved field 504 and an extended sub-header type field 506 that indicates the type of sub-header. In various embodiments, the extended sub-header includes 1 byte, divided as 1 bit for the reserved field 504 and 7 bits for the extended sub-header type field 506. In various embodiments, of the 802.16 standard a different number of sub-header types may be possible.

For example, in the 802.16e standard 8 types may be possible. In another embodiment, in the 802.16m standard more types may be possible.

In one embodiment, an extended sub-header body 508 follows the extended sub-header. In various embodiments, these extended sub-headers may be repeated as needed. FIG. 5a illustrates these by the ellipse and "n" numbered elements (e.g., 504n, 506n, 508n, etc.).

FIGS. 5b and 5c are a block diagram of sub-header groups 500b and 500c in accordance with at least one example embodiment of the disclosed subject matter. In one embodiment, the controller 204 or apparatus 200 may be configured to generate a MAC PDU that includes a plurality of extended sub-headers, and wherein the MAC PDU does not include an Extended Sub-header Group Length field (e.g., field 502). In such an embodiment, 1 byte or more may be removed or saved from the MAC PDU. In one embodiment, the controller 204 or apparatus 200 may be configured to store and wirelessly transmit this MAC PDU.

FIG. 5b is a block diagram of a sub-header group 500b in accordance with at least one example embodiment of the disclosed subject matter. In one embodiment, the controller 204 or apparatus 200 may be configured to generate an at least two layer bit mask. In one embodiment, the first layer 520 may include a plurality of bits. In various embodiments, each (or i-th) bit of the first layer of the bit mask indicates whether or not an i-th byte of the second layer of the bit mask exists. In some embodiments, the first layer 520 may include 1 byte.

In one embodiment, the second layer 522 and 522i may include at least one byte. In various embodiments, each (or j-th) bit of the second layer of the bit mask indicates a corresponding type of an extended sub-header associated with the second layer of the bit mask. For example, in such an embodiment, the $10^{th}$ bit of the second layer may indicate that a sub-header of type #10 is included in the MAC PDU. In various embodiments, the second sub-layer 522 may be organized into byte chucks or portions, such that the j-th bit is calculated by the bit in the sub-layer byte and the byte in which the bit is to be found. For example, if the $2^{nd}$ bit in the $3^{rd}$ byte is set, it may be calculated that the $18^{th}$ bit of the second sub-layer has been set. Where, 18 equals 8 bits per byte times the 2 skipped bytes (the $1^{st}$ & $2^{nd}$ bytes of the second sub-layer 522) plus two bits within the $3^{rd}$ byte. In such an embodiment, the $3^{rd}$ bit of the first sub-layer 520 may be set and the $1^{st}$ & $2^{nd}$ bytes of the second sub-layer may be omitted. In various embodiments, the $1^{st}$, $2^{nd}$, and $3^{rd}$ bits of the first sub-layer 520 may be set.

In such an embodiment, the controller 204 and apparatus 200 may be configured to only generate the minimum necessary number of bytes for the second sub-layer 522. For example, in the instance where the highest set bit is the $18^{th}$ bit (in the $3^{rd}$ byte), only 1 byte (i.e., the $3^{rd}$ byte) may be generated for the second sub-layer 522 despite having, in one embodiment, a maximum of 64 extended sub-header types (normally requiring 8-bytes).

In one embodiment, the controller 204 or apparatus 200 may be configured to generate the extended sub-header bodies 508 and 508n corresponding to the types indicated by the second layer 522. In one embodiment, these extended sub-header bodies 524 may be added after the multiple layer bit mask 520 and 522. In various embodiments, extended sub-header bodies 524 may be arranged in the order of type.

FIG. 5c is a block diagram of a sub-header group 500c in accordance with at least one example embodiment of the disclosed subject matter. In one embodiment, the controller 204 or apparatus 200 may be configured to generate a flag 530 and 530n that indicates if additional extended sub-header(s) follow a current extended sub-header. In one embodiment, this flag 530 may include 1 bit. In various embodiments, this flag 530 may repurpose the reserved field 504. In such an embodiment, the receiving apparatus 200 may be configured to stop processing extended sub-headers once an instance of the flag 530 indicates that current extended sub-header is the last extended sub-header. In one embodiment, this may allow for the removal or abridgement of the extended sub-header group length field 502 and a savings of at least 1 byte.

In one embodiment, the controller 204 or apparatus 200 may be configured to generate an extended sub-header type field 532 and 532n that indicates the type of extended sub-header of the current extended sub-header. In various embodiments, the extended sub-header type field 532 may be substantially identical to the extended sub-header type field 506. In one embodiment, the controller 204 or apparatus 200 may be configured to generate a body 508 and 508n of the current extended sub-header.

FIG. 6 is a flowchart of a technique 600 in accordance with an example embodiment of the disclosed subject matter. Block 602 illustrates that, in one embodiment, a plurality of Service Data Units (SDUs) from a plurality of connections associated with a Mobile Station (MS) may be packed into a single Medium Access Control (MAC) Protocol Data Unit (PDU), as described above. In one embodiment, the controller 204 or apparatus 200 of FIG. 2 may perform this action, as described above.

Block 604 illustrates that, in one embodiment, if an error correction scheme is used for the first connection of the plurality of connections, the error correction scheme may be used for the GMH, any subheaders before the SDU(s) associated with the first connection, and the SDU(s) associated with the first connection, as described above. Block 606 illustrates that, in one embodiment, if an error correction scheme is used for the post-first connection of the plurality of connections, the error correction scheme may be used for the SDU(s) associated with the post-first connection and the EPSH associated with the SDU(s), as described above. In one embodiment, the controller 204 or apparatus 200 of FIG. 2 may perform these actions, as described above.

Block 608 illustrates that, in one embodiment, an Extended Packing Sub-Header (EPSH) with a Generic MAC Header (GMH) may be generate that indicates that a plurality of Service Data Units (SDUs) from a plurality of connections associated with a Mobile Station (MS) have been packed into the MAC PDU, as described above. In various embodiments, the Block 608 may be included as part of Block 602. In one embodiment, the controller 204 or apparatus 200 of FIG. 2 may perform this action, as described above.

Block 610 illustrates that, in one embodiment, each EPSH associated with a SDU may include a First SDU Indication field (FSI) that indicates if the SDU is a first SDU associated with a connection identifier (CID) of the SDU, as described above. Block 612 illustrates that, in one embodiment, each EPSH associated with the first SDU associated with a connection may include a Connection Index field (CI) that indicates the connection identifier of the SDU, and a Encryption Key Sequence (EKS) field that indicates the encryption key used to encrypt the SDU, as described above. In one embodiment, the controller 204 or apparatus 200 of FIG. 2 may perform these actions, as described above.

Block 614 illustrates that, in one embodiment, the MAC PDU may be wirelessly transmitted, as described above. In one embodiment, the transceiver 202 or apparatus 200 of FIG. 2 may perform this action, as described above.

FIG. 7 is a flowchart of a technique 700 in accordance with an example embodiment of the disclosed subject matter.

Block 702 illustrates that, in one embodiment, a MAC PDU may be generated, as described above. In various embodiments, generating may include the actions of Block 704 and 712, as described above. In one embodiment, the controller 204 or apparatus 200 of FIG. 2 may perform these actions, as described above.

Block 704 illustrates that, in one embodiment, a single form of error protection may be selected to protect the MAC PDU from data corruption, as described above. Block 706 illustrates that, in one embodiment, selecting may include if Hybrid automatic repeat-request (HARQ) is enabled for a connection associated with the MAC PDU, selecting to use only HARQ error protection for the MAC PDU, as described above. Block 708 illustrates that, in one embodiment, selecting may include if cyclic redundancy check (CRC) is enabled for the connection associated with the MAC PDU, selecting to use only CRC error protection for the MAC PDU, as described above. Block 710 illustrates that, in one embodiment, selecting may include selecting to use only Header Check Sequence (HCS) error protection to protect the GMH in the MAC PDU, as described above. In one embodiment, the controller 204 or apparatus 200 of FIG. 2 may perform these actions, as described above.

Block 712 illustrates that, in one embodiment, the form of error protection may be masked with a basic connection identifier (CID) associated with a mobile station (MS) associated with the MAC PDU if group allocation is applied to the MAC PDUs, as described above. In one embodiment, the controller 204 or apparatus 200 of FIG. 2 may perform this action, as described above.

Block 714 illustrates that, in one embodiment, the MAC PDU may be stored, as described above. In one embodiment, the memory 206 or apparatus 200 of FIG. 2 may perform this action, as described above. Block 716 illustrates that, in one embodiment, the MAC PDU may be wirelessly transmitted, as described above. In one embodiment, the transceiver 202 or apparatus 200 of FIG. 2 may perform this action, as described above.

FIG. 8 is a flowchart of a technique 800 in accordance with an example embodiment of the disclosed subject matter. Block 802 illustrates that, in one embodiment, a MAC PDU may be generated, as described above. Block 804 illustrates that, in one embodiment, the MAC PDU does not include an Extended Subheader Group Length field, as described above. In one embodiment, the controller 204 or apparatus 200 of FIG. 2 may perform this action, as described above.

Block 806 illustrates that, in one embodiment, generating may include generating an at least two layer bit mask, as described above. Block 808 illustrates that, in one embodiment, generating may include wherein each i-th bit of a first layer of the bit mask indicates whether or not an i-th byte of a second layer of the bit mask exists, as described above. Block 810 illustrates that, in one embodiment, generating may include wherein each bit of the second layer of the bit mask indicates a corresponding type of an extended subheader associated with the second layer of the bit mask, as described above. In one embodiment, the controller 204 or apparatus 200 of FIG. 2 may perform these actions, as described above.

Block 812 illustrates that, in one embodiment, generating may include for each extended subheader performing some or all of the Blocks 814, 816, and 818, as described above. Block 814 illustrates that, in one embodiment, generating may include generating a flag that indicates if additional extended subheader(s) follow a current extended subheader, as described above. Block 816 illustrates that, in one embodiment, generating may include generating an extended subheader type field that indicates the type of extended subheader of the current extended subheader, as described above. Block 818 illustrates that, in one embodiment, generating may include generating a body of the current extended subheader, as described above. In one embodiment, the controller 204 or apparatus 200 of FIG. 2 may perform these actions, as described above.

Block 820 illustrates that, in one embodiment, the MAC PDU may be stored, as described above. In one embodiment, the memory 206 or apparatus 200 of FIG. 2 may perform this action, as described above. Block 822 illustrates that, in one embodiment, the MAC PDU may be wirelessly transmitted, as described above. In one embodiment, the transceiver 202 or apparatus 200 of FIG. 2 may perform this action, as described above.

FIG. 9 is a flowchart of a technique 900 in accordance with an example embodiment of the disclosed subject matter. Block 902 illustrates that, in one embodiment, a MAC PDU may be generated, as described above. Block 904 illustrates that, in one embodiment, the MAC PDU may include an abridged or truncated Generic MAC Header (GMH), as described above. In one embodiment, the controller 204 or apparatus 200 of FIG. 2 may perform these actions, as described above.

Block 906 illustrates that, in one embodiment, generating may include determining a size of Fragment Sequence Numbers (FSNs) for MAC PDU(s) associated with a service flow during the creation of the service flow, as described above. Block 908 illustrates that, in one embodiment, generating may include associating a connection identifier (CID) with the service flow, as described above. Block 910 illustrates that, in one embodiment, generating may include 910 using the CID associated with a MAC PDU to indicate the size of the FSN to be used to generate the MAC PDU, as described above. Block 912 illustrates that, in one embodiment, generating may include generating a GMH that does not include an Extended Type (ET) field within a Type field of the GMH, as described above. In one embodiment, the controller 204 or apparatus 200 of FIG. 2 may perform these actions, as described above.

Block 914 illustrates that, in one embodiment, generating may include determining whether or not to use an error correction scheme for MAC PDU(s) associated with a service flow during the creation of the service flow, as described above. Block 916 illustrates that, in one embodiment, generating may include associating a connection identifier (CID) with the service flow, as described above. Block 918 illustrates that, in one embodiment, generating may include using the CID associated with a MAC PDU to indicate whether or not an error protection scheme is to be used to generate the MAC PDU, as described above. Block 920 illustrates that, in one embodiment, generating may include generating a GMH that does not include a cyclic redundancy check (CRC) indicator (CI) field, as described above. In one embodiment, the controller 204 or apparatus 200 of FIG. 2 may perform these actions, as described above.

Block 922 illustrates that, in one embodiment, generating may include mapping the connection associated with a Mobile Station (MS) to a security association (SA), as described above. Block 924 illustrates that, in one embodiment, generating may include using the connection identifier (CID) of the GMH to indicate if the MAC PDU is to be encrypted, as described above. Block 926 illustrates that, in one embodiment, generating may include generating a GMH that does not include an encryption control (EC) field, as described above. In one embodiment, the controller 204 or apparatus 200 of FIG. 2 may perform these actions, as described above.

Block 928 illustrates that, in one embodiment, the MAC PDU may be stored, as described above. In one embodiment, the memory 206 or apparatus 200 of FIG. 2 may perform this action, as described above. Block 930 illustrates that, in one embodiment, the MAC PDU may be wirelessly transmitted, as described above. In one embodiment, the transceiver 202 or apparatus 200 of FIG. 2 may perform this action, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
a controller configured to:
pack a plurality of Service Data Units (SDUs) from a plurality of connections associated with a Mobile Station (MS) into a single Medium Access Control (MAC) Protocol Data Unit (PDU),
generate a Generic MAC Header (GMH), and
generate, for each SDU, an associated Extended Packing Sub-Header (EPSH);
select a single form of error protection to be used to protect at least a portion of the MAC PDU, the selecting being performed according to a priority of: 1) Hybrid automatic repeat-request (HARM), 2) cyclic redundancy check (CRC) and 3) Header Check Sequence (HCS);
apply group allocation to the MAC PDU, and mask the form of error protection with a basic connection identifier (CID) associated with a mobile station (MS) associated with the MAC PDU; and
apply the selected form of error protection to the MAC PDU;
a memory configured to store the MAC PDU; and
a wireless transceiver configured to transmit the MAC PDU.

2. The apparatus of claim 1 wherein only the EPSHs associated with a first SDU of a group of SDUs further includes:
a Connection Index (CI) field that indicates the connection associated with the group of SDUs; and
an Encryption Key Sequence (EKS) field that indicates the encryption key used to encrypt the group of SDUs.

3. The apparatus of claim 1 wherein the controller is configured to:
use an error correction scheme for a first connection of the plurality of connections associated with a Mobile Station (MS), and use the error correction scheme for the GMH, any subheaders before the SDU(s) associated with the first connection, and the SDU(s) associated with the first connection.

4. The apparatus of claim 1 wherein the controller is configured to:
use the selected form of error protection for a post-first connection of the plurality of connections associated with a Mobile Station (MS), and use the selected form of error protection for the SDU(s) associated with the post-first connection and the EPSH associated with the SDU(s).

5. An apparatus comprising:
a controller configured to:
determine which of a plurality of forms of error protection are enabled for a connection including Hybrid automatic repeat-request (HARQ), cyclic redundancy check (CRC) and Header Check Sequence (HCS);

generate a Medium Access Control (MAC) Packet Data Unit (PDU);

select a single form of error protection to be used to protect at least a portion of the MAC PDU, the selecting being performed according to a priority of: 1) HARQ, 2) CRC, and 3) HCS;

apply group allocation to the MAC PDU, and mask the form of error protection with a basic connection identifier (CID) associated with a mobile station (MS) associated with the MAC PDU; and apply the selected form of error protection to the MAC PDU;

a memory configured to store the MAC PDU; and a wireless transceiver configured to transmit the MAC PDU.

6. An apparatus comprising:

a controller configured to:

generate a Medium Access Control (MAC) Packet Data Unit (PDU) that includes an abridged Generic MAC Header (GMH), wherein the GMH is abridged by leaving out at least one field that can be derived from a connection identifier for the MAC PDU wherein the at least one field is a non-connection identifier field;

select a single form of error protection to be used to protect at least a portion of the MAC PDU, the selecting being performed according to a priority of: 1) Hybrid automatic repeat-request (HARM), 2) cyclic redundancy check (CRC) and 3) Header Check Sequence (HCS);

apply group allocation to the MAC PDU, and mask the form of error protection with a basic connection identifier (CID) associated with a mobile station (MS) associated with the MAC PDU; and apply the selected form of error protection to the MAC PDU;

a memory configured to store the MAC PDU; and a wireless transceiver configured to transmit the MAC PDU.

7. The apparatus of claim 6 wherein the controller is configured to:

map the connection associated with a Mobile Station (MS) to a security association (SA);

use the connection identifier (CID) of the GMH to indicate that the MAC PDU is to be encrypted; and generate a GMH that does not include the encryption control (EC) field.

8. The apparatus of claim 6 wherein the controller is configured to:

determine whether or not to use an error correction scheme for MAC PDU(s) associated with a service flow during the creation of the service flow;

associate a connection identifier (CID) with the service flow;

use the CID associated with a MAC PDU to indicate whether or not an error protection scheme is to be used to generate the MAC PDU; and generate a GMH that does not include the cyclic redundancy check (CRC) indicator (CI) field.

9. The apparatus of claim 6 wherein the controller is configured to:

determine a size of Fragment Sequence Numbers (FSNs) for MAC PDU(s) associated with a service flow during the creation of the service flow;

associate a connection identifier (CID) with the service flow;

use the CID associated with a MAC PDU to indicate the size of the FSN to be used to generate the MAC PDU; and generate a GMH that does not include the Extended Type (ET) field within the Type field of the GMH.

10. A method comprising:

packing a plurality of Service Data Units (SDUs) from a plurality of connections associated with a Mobile Station (MS) into a single Medium Access Control (MAC) Protocol Data Unit (PDU);

generating an Extended Packing Sub-Header (EPSH) with a Generic MAC Header (GMH);

generating, for each SDU, an associated EPSH;

selecting a single form of error protection to be used to protect at least a portion of the MAC PDU, the selecting being performed according to a priority of: 1) Hybrid automatic repeat-request (HARM), 2) cyclic redundancy check (CRC) and 3) Header Check Sequence (HCS);

applying group allocation to the MAC PDU, and mask the form of error protection with a basic connection identifier (CID) associated with a mobile station (MS) associated with the MAC PDU;

applying the selected form of error protection to the MAC PDU; and wirelessly transmitting the MAC PDU.

11. The method of claim 10 wherein only the EPSHs associated with a first SDU of a group of SDUs includes:

a Connection Index field (CI) that indicates the connection of the group of SDUs, and a Encryption Key Sequence (EKS) field that indicates the encryption key used to encrypt the group of SDUs.

12. The method of claim 10 wherein packing comprises:

using the selected form of error protection for a first connection of the plurality of connections associated with a Mobile Station (MS), and using the selected form of error protection for the GMH, any subheaders before the SDU(s) associated with the first connection, and the SDU(s) associated with the first connection.

13. The method of claim 10 wherein packing comprises:

using the selected form of error protection for a post-first connection of the plurality of connections associated with a Mobile Station (MS), and using the selected form of error protection for the SDU(s) associated with the post-first connection and the EPSH associated with the SDU(s).

14. A method comprising:

determining which of a plurality of forms of error protection are enabled for a connection including Hybrid automatic repeat-request (HARM), cyclic redundancy check (CRC) and Header Check Sequence (HCS);

generating a Medium Access Control (MAC) Packet Data Unit (PDU);

selecting a single form of error protection to be used to protect at least a portion of the MAC PDU, the selecting being performed according to a priority of: 1) HARQ, 2) CRC, and 3) HCS;

applying group allocation to the MAC PDU, and mask the form of error protection with a basic connection identifier (CID) associated with a mobile station (MS) associated with the MAC PDU;

apply the selected form of error protection to the MAC PDU; and transmit the MAC PDU.

15. A method comprising:
generating a Medium Access Control (MAC) Packet Data Unit (PDU) that includes an abridged Generic MAC Header (GMH),
wherein the GMH is abridged by leaving out at least one field that can be derived from a connection identifier for the MAC PDU wherein the at least one field is a non-connection identifier field;
selecting a single form of error protection to be used to protect at least a portion of the MAC PDU, the selecting being performed according to a priority of: 1) Hybrid automatic repeat-request (HARM), 2) cyclic redundancy check (CRC) and 3) Header Check Sequence (HCS);
applying group allocation to the MAC PDU, and mask the form of error protection with a basic connection identifier (CID) associated with a mobile station (MS) associated with the MAC PDU;
applying the selected form of error protection to the MAC PDU; and
wirelessly transmitting the MAC PDU.

16. The method of claim 15 wherein generating includes:
mapping the connection associated with a Mobile Station (MS) to a security association (SA);
using the connection identifier (CID) of the GMH to indicate that the MAC PDU is to be encrypted; and
generating a GMH that does not include the encryption control (EC) field.

17. The method of claim 15 wherein generating includes:
determining whether or not to use an error correction scheme for MAC PDU(s) associated with a service flow during the creation of the service flow;
associating a connection identifier (CID) with the service flow;
using the CID associated with a MAC PDU to indicate whether or not an error protection scheme is to be used to generate the MAC PDU; and
generating a GMH that does not include the cyclic redundancy check (CRC) indicator (CI) field.

18. The method of claim 15 wherein generating includes:
determining a size of Fragment Sequence Numbers (FSNs) for MAC PDU(s) associated with a service flow during the creation of the service flow;
associating a connection identifier (CID) with the service flow;
using the CID associated with a MAC PDU to indicate the size of the FSN to be used to generate the MAC PDU; and
generating a GMH that does not include the Extended Type (ET) field within the Type field of the GMH.

* * * * *

UNITED STATES PATENT AND TRADEMARK OFFICE
CERTIFICATE OF CORRECTION

PATENT NO. : 8,498,248 B2  
APPLICATION NO. : 12/141036  
DATED : July 30, 2013  
INVENTOR(S) : Haihong Zheng et al.

Page 1 of 1

It is certified that error appears in the above-identified patent and that said Letters Patent is hereby corrected as shown below:

Title page 2, in column 1, under "Other Publications", line 8, delete "Abrreviations" and insert -- Abbreviations --, therefor.

In the Claims

In column 16, line 31, in claim 1, delete "(HARM)," and insert -- (HARQ), --, therefor.

In column 17, line 31, in claim 6, delete "(HARM)," and insert -- (HARQ), --, therefor.

In column 18, line 19, in claim 10, delete "(HARM)," and insert -- (HARQ), --, therefor.

In column 18, line 53, in claim 14, delete "(HARM)," and insert -- (HARQ), --, therefor.

In column 19, line 12, in claim 15, delete "(HARM)," and insert -- (HARQ), --, therefor.

Signed and Sealed this  
Twelfth Day of November, 2013

Teresa Stanek Rea  
*Deputy Director of the United States Patent and Trademark Office*